Aug. 6, 1957     L. J. CORKERY     2,801,535
CLUTCH
Filed Feb. 7, 1956
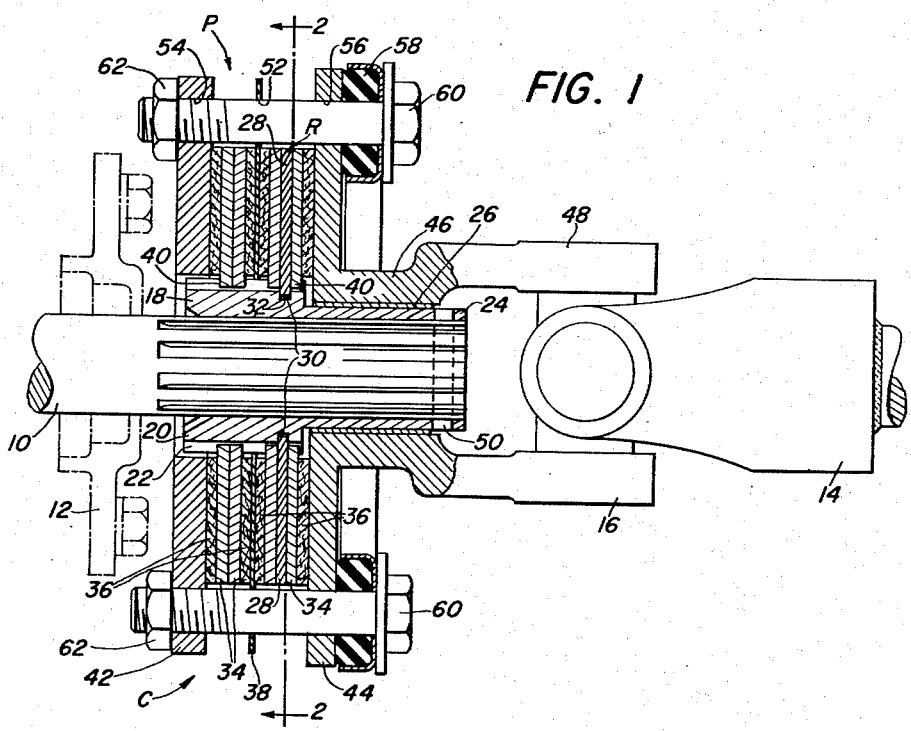
INVENTOR.
L. J. CORKERY

United States Patent Office 2,801,535
Patented Aug. 6, 1957

2,801,535

CLUTCH

Leon J. Corkery, Moline, Ill., assignor to Deere & Company, Moline, Ill., a corporation of Illinois Application February 7, 1956, Serial No. 563,942

12 Claims. (Cl. 64—30)

This invention relates to a clutch and more particularly to a clutch of the slip or torque-discriminating type, in which the driving and driven parts can slip relative to each other when overloaded.

In the use of simple and inexpensive designs of clutches of the general character noted, particularly as employed in the agricultural implement field, the clutch components are used in series in a power train, part of the clutch being carried by an input shaft and another part of the clutch including a universal joint for connection to the driving shaft, or vice versa. In a typical clutch, the input shaft will be externally splined and carries, splined thereto, an externally splined hub which mounts a plurality of internally splined friction rings, these rings cooperating with driving plates to form a clutch pack. One of the driving plates will be connected to the driving shaft and, in view of the splined connection between the hub and the driven plates or rings, there is a likelihood of axial escape of the clutch pack from the hub, which cannot be prevented by the simple expedient of tying the driving plates to the hub, because these plates must rotate relative to the hub. Heretofore, one solution has been accomplished by interposing a retainer ring in the clutch pack and welding it to the hub, sandwiching the retainer plate between certain of the plates of the clutch pack. However, this has proven to be a fairly complicated and expensive mode of construction.

According to the present invention, the over-all design of the clutch is simplified by the provision of a retainer plate that is received in an annular groove in the hub, which groove intersects the splines and receives inner portions of the retainer plate, it being significant that the retainer plate is made up of a pair of half-rings so that each half-ring may be radially inserted and radially withdrawn from its respective grooves. In the assembly of the clutch, the end plates that confine the clutch pack between them include axially extending compression members which are arranged on a circle larger than the diameter of the retainer plate, the compression members thus being in a position to prevent accidental radial escape of the retainer plate half-rings. The invention features, of course, the utilization of a plurality of part-rings following the principles just explained.

Various features of the invention, in addition to those expressed above, will become apparent to those versed in the art as a preferred embodiment of the invention is disclosed in detail in the ensuing specification and accompanying sheet of drawings, the two figures of which will be described immediately below.

Fig. 1 is a longitudinal sectional view through a preferred type of clutch.

Fig. 2 is a transverse section as seen along the line 2—2 of Fig. 1.

In the following specification, as well as in the appended claims, the expressions "driving" and "driven" are used only as a matter of convenience, since the characteristic of a part as driving or driven may obviously be reversed. In the present environment, a driven shaft 10 is shown as being journaled in a suitable support, as at 12, and power is transmitted to the driven shaft by means of a driving shaft 14, a universal joint 16, and a clutch designated generally by the letter C.

The clutch itself comprises a rotatable central member or hub 18 having at one end thereof a relatively enlarged portion 20, provided with one or more keyways in the form of a plurality of external axial splines 22, and an integral coaxial extension portion 24 of reduced diameter to afford a cylindrical bearing at 26.

The clutch comprises a clutch pack P and retainer means R, part of the clutch pack being connected to the hub 18 and part of the clutch pack being connected to the universal joint 16 so that a frictional driving relationship is established between the driving and driven shafts 14 and 10.

The retainer means R comprises a pair of semi-circular half-rings 28; although, a greater number could be employed if desired. The two plates or half-rings are assembled in radial alinement to form a circular retainer plate and each plate has a central semi-circular notch or recess 30 which, when the half-rings are assembled, forms a central aperture. The hub 18 has groove portions, here afforded by an annular groove 32 which intersects and is deeper than the splines 22. The circle afforded by the complementary plate notches 30 is therefore of a diameter smaller than the circle on which lies the depth of the splines, the marginal portions of the plate sections or half-rings bordering the notches 30 being complementarily received in the annular groove 32 so as to be radially insertable into the groove and radially withdrawable from the groove. When the sections are received in the groove, they are held by the groove against axial displacement relative to the hub 18. The clutch pack includes a plurality of circular friction ring elements 34, each of which is faced with friction material 36 at one of its faces, and these friction rings are preferably arranged in pairs, with the exception that the rings in the right hand pair are separated by the retainer plate R, and with the further exception that the two innermost friction rings are separated by an intermediate driving ring 38. Each of the friction rings is internally splined at 40 for receipt in or accommodation by the splines 22 on the hub 18, each splined portion 40 providing key means for association with each of the key means afforded by a spline 22 on the hub. The intermediate ring 38 is free of the splines 22 and is therefore capable of rotation relative to the hub and friction rings 34, except for the frictional drive relation established by the clutch pack and a pair of end plates 42 and 44 which axially confine the friction rings therebetween. The end plates 42 and 44, like the intermediate plate 38, are free to rotate relative to the friction plates and hub when the clutch is subjected to excess loading. The end plate 44 is journaled on the bearing 26 afforded by the reduced hub portion 24, having integral therewith a sleeve 46 which is extended axially to form a yoke 48 of the universal joint 16. A retaining pin 50 holds the hub 18 against axial displacement relative to the driven shaft 10 and the retainer means R holds the entire clutch pack against axial displacement relative to the hub, as will presently appear.

As will be apparent from Fig. 1, the diameters of the friction plates 34 and retainer ring or plate R are substantially uniform, and it will be further seen that the peripheral outer portions of the intermediate and end plates 38, 42 and 44 project radially beyond the peripheries of the friction and retainer plates. The outer portion of the intermediate plate 38 is apertured at 52 and there are a plurality of these apertures in circumferentially spaced relation (Fig. 2). The end plate 42 similarly has a plurality of apertures 54 in axial register with the apertures 52 in the plate 38. Likewise, the end plate 44 has apertures 56 in axial register with the apertures just described. When the clutch is assembled, with the retainer plate R in place, and with the apertures respectively in axial register, a circumferentially apertured resilient member or ring 58 is added to the end plate 44 and a plurality of axial compression members, here in the form of bolts 60, are passed through the respectively registered apertures, opposite ends of the bolts being threaded to receive nuts 62. The nuts 62 may be tightened or loosened to adjust the frictional capacity of the clutch pack P.

In view of the fact that the apertures through which the bolts 60 pass lie on a circle of greater diameter than the outer peripheries of the retainer and friction plates, the bolts 62 have their inner portions serving as means for preventing radial escape of the retainer plate half-sections from the hub groove 32. Hence, in normal operation, the bolts 62 not only adjust the frictional capacity of the clutch pack but also retain the retainer R from separation along its diametrical split as indicated at 64 in Fig. 2. Since the retainer plate is sandwiched among certain of the plates of the clutch pack, and since the retainer plate is itself held by the groove 32 against axial escape from the hub, the entire clutch pack is also prevented from axial escape. This is important for maintaining the relative axial position of the clutch so that if any telescopic movement is desired between the input and output shafts, it can be accommodated in suitable provision in the driving shaft 14.

If it is desired to disassemble the clutch for removal from the hub, the nuts 62 can be removed from the bolts and the bolts withdrawn, thus permitting radial separation of the retainer plates 28 so that the inner notched portions thereof are clear of the groove 32. Reassembly of the clutch or of a clutch including replaced components is just as easily accomplished.

Various features of the invention not categorically enumerated herein will undoubtedly occur to those versed in the art, as will many modifications and alterations in the preferred embodiment disclosed, all of which may be achieved without departing from the spirit and scope of the invention.

What is claimed is:

1. A clutch, comprising: a rotatable central member having external axial splines and further having an external annular groove intersecting said splines; a pair of complementary radially alined half-rings embracing the central member and having inner portions received in the groove to afford a retainer plate confined against axial shifting relative to said member; a plurality of radial friction rings coaxial on the central member with the retainer plate sandwiched therebetween, said friction rings having internal splines received by the external splines of said member so as to be capable of relative axial shifting, and said friction rings and the retainer plate being of substantially the same diameter; a pair of end plates rotatable relative to the member and friction rings and spaced coaxially apart with the friction rings between them, said end plates having circumferentially spaced outer portions radially outwardly of the peripheries of the friction rings and retainer plate; and a plurality of removable compression members extending axially between said outer portions to draw the end plates together into frictional contact with the friction rings and engaging peripheral portions of the half-rings to confine the half-rings against radial escape from the annular groove.

2. The invention defined in claim 1, including: a coaxial reduced bearing extension on and rigid with the central member and journalling one of the end plates.

3. The invention defined in claim 1, including: an intermediate ring coaxially received between a pair of the friction rings and having an inner portion free of the external spline and circumferentially spaced outer portions receiving the compression members so as to be rotatable with the end plates.

4. A clutch, comprising: a rotatable central member having an external axial keyway and further having external radially alined groove portions transverse to the axis of said member; a plurality of radially alined complementary part-rings embracing the central member and respectively having inner portions received in the groove portions to afford a retainer plate confined against axial shifting relative to said member; a plurality of radial friction rings coaxial on the central member with the retainer plate sandwiched therebetween, said friction rings having internal key portions received by the keyway of said member so as to be capable of relative axial shifting, and said friction rings and the retainer plate being of substantially the same diameter; a pair of end plates rotatable relative to the member and friction rings and spaced coaxially apart with the friction rings between them, said end plates having circumferentially spaced outer portions radially outwardly of the peripheries of the friction rings and retainer plate; and a plurality of removable compression members extending axially between said outer portions to draw the end plates together into frictional contact with the friction rings and engaging peripheral portions of the half-rings to confine the part-rings against radial escape from said groove portions.

5. The invention defined in claim 4, including: a coaxial reduced bearing extension on and rigid with the central member and journalling one of the end plates.

6. The invention defined in claim 4, including: an intermediate ring coaxially received between a pair of the friction rings and having an inner portion free of the keyway and circumferentially spaced outer portions receiving the compression members so as to be rotatable with the end plates.

7. A clutch, comprising: a rotatable central member having an external axial keyway; a clutch pack including a friction ring element encircling the member and having key means received in said keyway to constrain said element for rotation with said member but to enable relative axial shifting between the two, and said pack further including a pair of coaxially spaced apart end plates rotatable relative to the member and having the friction ring means confined therebetween to afford a frictional drive connection between the member and said end plates; retainer means disposed axially intermediate the end plates and radially inwardly engageable with the central member and axially engageable by the clutch pack to prevent axial escape of the clutch pack from said member, said retainer means being radially outwardly disengageable from said member to enable axial separation of said member and clutch pack.

8. The invention defined in claim 7, including: removable means carried by one of the end plates and normally operative to confine the retainer means against radially outward disengagement from the member.

9. A clutch, comprising: a rotatable central member having an external axial keyway and including rigid therewith a coaxial cylindrical bearing extension axially beyond one end of said keyway; a clutch pack including a friction ring element encircling the member and having key means received in said keyway to constrain said element for rotation with said member but to enable relative axial shifting between the two, and said pack further including a pair of coaxially spaced apart end plates rotatable relative to the member and having the friction ring means confined therebetween to afford a frictional drive connection between the member and said end plates, one of said end plates being journaled on the bearing extension; and removable retainer means axially intermediate the end plates and engaging the clutch pack to prevent axial escape of said pack from the central member.

10. A clutch, comprising: a rotatable member having an axial keyway and radially alined groove portions transverse to the length of the keyway; a plurality of radially alined complementary part rings assembled to form a radial retainer plate having peripheral portions respectively received by the groove portions for constraint against axial shifting relative to the member; a plurality of radial friction rings coaxial with and sandwiching the retainer plate between them and having key portions received in the keyway to constrain said friction rings for rotation with the member while permitting relative axial movement between them, said friction rings and the retainer plate having peripheries of substantially the same diameter; a pair of end plates rotatable relative to the member and friction rings and spaced coaxially apart with the friction rings between them, said end plates having circumferentially spaced portions radially clear of the peripheries of the friction ring and retainer plate; and a plurality of removable compression members extending axially between said end plate portions to draw the end plates into frictional contact with the friction rings and engaging peripheral portions of the part-rings to confine the part-rings against radial escape from the groove portions of the member.

11. A clutch, comprising: a rotatable member having an axial keyway; a clutch pack coaxial with the member and including a friction ring element having key means received by the keyway for rotation with but for axial shifting relative to said member, said pack further having coaxially spaced apart end rings coaxial with and rotatable relative to the member and friction ring element and having the friction ring element confined therebetween to afford a frictional drive between said plates and the member; retainer means disposed axially between the end plates and engageable by the clutch pack to prevent axial escape of the pack from the member, said retainer means being radially separable from the member to permit axial separation of the pack and member; and removable means carried by one of the end plates and normally confining the retaining means against radial separation from the member.

12. A clutch, comprising: a rotatable member having an axial keyway; a clutch pack coaxial with the member and including a friction ring element having key means received by the keyway for rotation with but for axial shifting relative to said member, said pack further having coaxially spaced apart end rings coaxial with and rotatable relative to the member and friction ring element and having the friction ring element confined therebetween to afford a frictional drive between said plates and the member; retainer means disposed axially between the end plates and engageable by the clutch pack to prevent axial escape of the pack from the member, said retainer means being radially separable from the member to permit axial separation of the pack and member; and removable compression means operative between the end plates to adjust the frictional relationship between said plates and the friction ring element, said compression means including means engaging and normally confining the retaining means against radial separation from the member.

No references cited.